United States Patent [19]

Kakinuma et al.

[11] Patent Number: 4,942,482
[45] Date of Patent: Jul. 17, 1990

[54] AUTOMATIC PAGE-TURNING DEVICE

[75] Inventors: Koichiro Kakinuma, Tokyo; Minoru Watanabe, Kanagawa, both of Japan

[73] Assignee: Sony Corporation, Tokyo, Japan

[21] Appl. No.: 891,465

[22] Filed: Jul. 31, 1986

[30] Foreign Application Priority Data

Aug. 9, 1985 [JP] Japan .................................. 60-17493
Feb. 20, 1986 [JP] Japan .................................. 61-36093

[51] Int. Cl.⁵ ............................................... H04H 1/04
[52] U.S. Cl. .................................. 358/474; 358/496; 358/498; 355/25; 355/82
[58] Field of Search ...................... 358/286, 293, 285; 248/441.1; 40/341, 342, 531; 355/25, 82

[56] References Cited

U.S. PATENT DOCUMENTS

| | | | |
|---|---|---|---|
| 3,484,970 | 3/1968 | Berlinsky et al. | 40/531 |
| 3,550,296 | 12/1970 | Castagna | 40/531 |
| 3,800,453 | 4/1974 | Kroes | 40/531 |
| 3,939,587 | 2/1976 | Westrom | 40/531 |
| 4,102,071 | 7/1978 | D'Arcy | 40/531 |
| 4,121,361 | 10/1978 | D'Arcy | 40/531 |
| 4,160,334 | 7/1979 | Willis | 40/531 |
| 4,515,358 | 5/1985 | Fujui | 271/122 |
| 4,545,141 | 10/1985 | Ito et al. | 40/531 |
| 4,673,286 | 6/1987 | Shimbrot | 355/25 |
| 4,693,594 | 9/1987 | Garavuso | 355/25 |

OTHER PUBLICATIONS

Patent Abstract of Japan, vol. 9, No. 281, Application JPA60-122932.

Primary Examiner—Edward L. Coles, Sr.
Attorney, Agent, or Firm—Lewis H. Eslinger; Jay H. Maioli

[57] ABSTRACT

An automatic page-turning device for turning pages of a book or the like as placed in an opened condition to expose a first page to be turned at one side of a spine and a second page in a stack of turned pages at the opposite side of the spine, comprises a carrier drum having a perforated peripheral wall and being bodily movable from a first position opposing an outer edge portion of the first page of the opened book to a second position in which the carrier drum opposes an outer edge portion of the second page, a suction device by which a vacuum is applied to the interior of the carrier in its first position for causing adherence of the first page thereto and the transport of the first page with the carrier drum toward the second position, with the first page being isolated from the effect of the vacuum at a position of the carrier drum intermediate its first and second positions for releasing the first page from the carrier drum and permitting the reception of such released first page by a page guiding member movable with the carrier drum and carrying the released first page at least until the carrier drum passes the spine of the book or the like, and a reverting roller in parallel, side-by-side relationship with the carrier drum and being movable therewith for withdrawing the first page from the page guiding member and stacking the same against the second page during final movement of the carrier drum to its second position. The automatic page-turning device is desirably applied to an optical reader system in which an optical reading element, such as, a CCD line sensor, is movable with the carrier drum in the course of the movement of the latter between its first and second positions for reading information on the exposed pages.

60 Claims, 12 Drawing Sheets

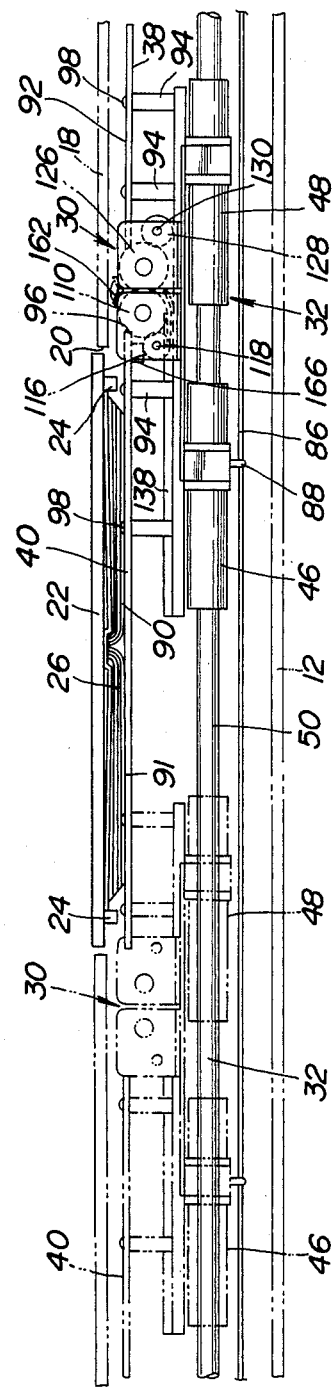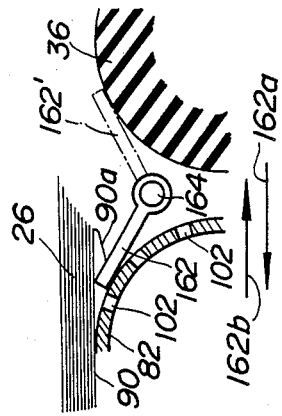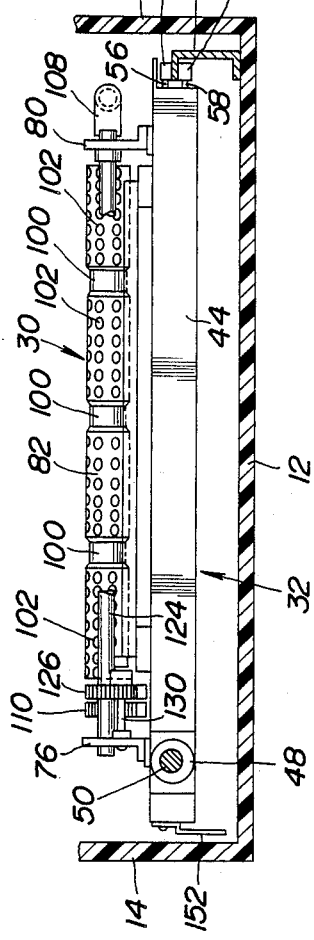

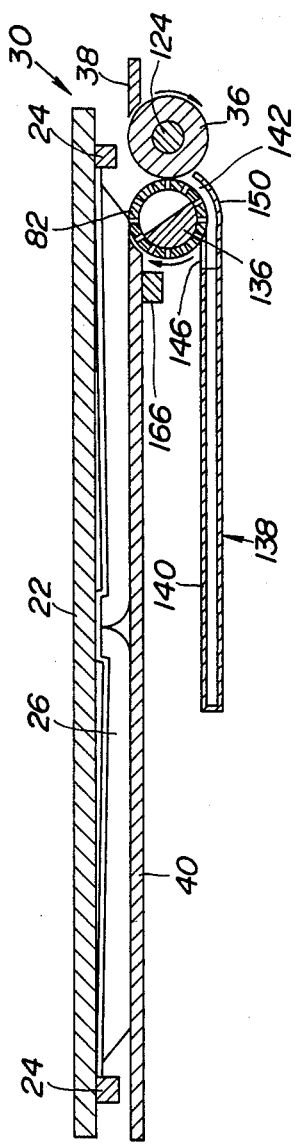
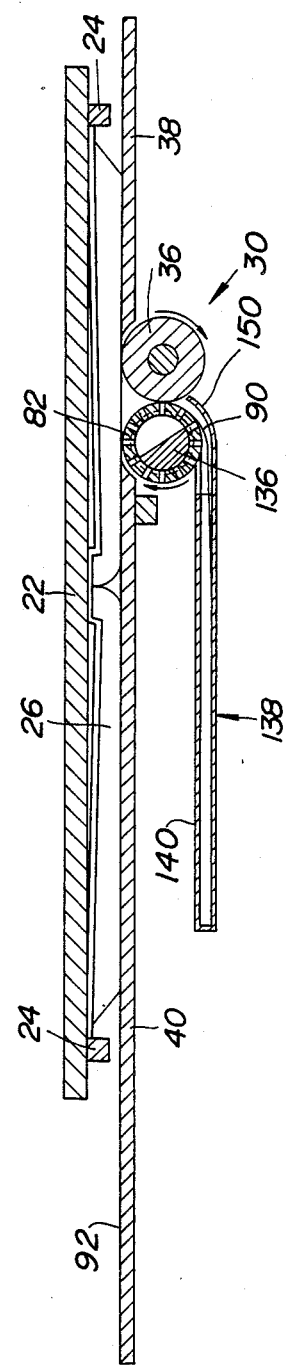
FIG.7(A)
FIG.7(B)

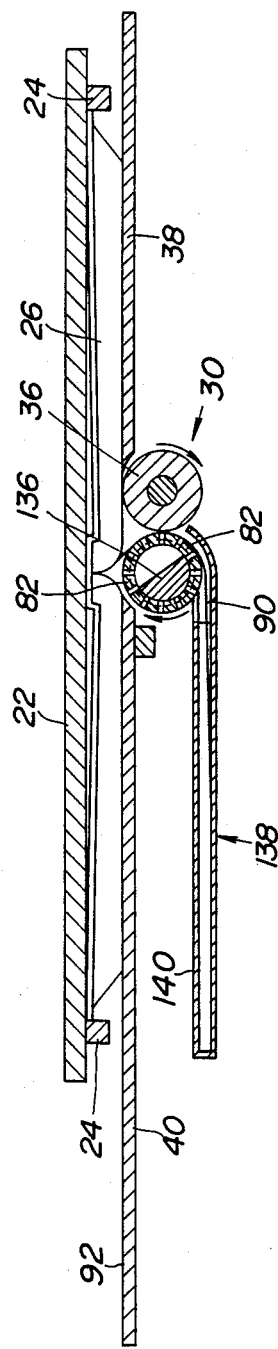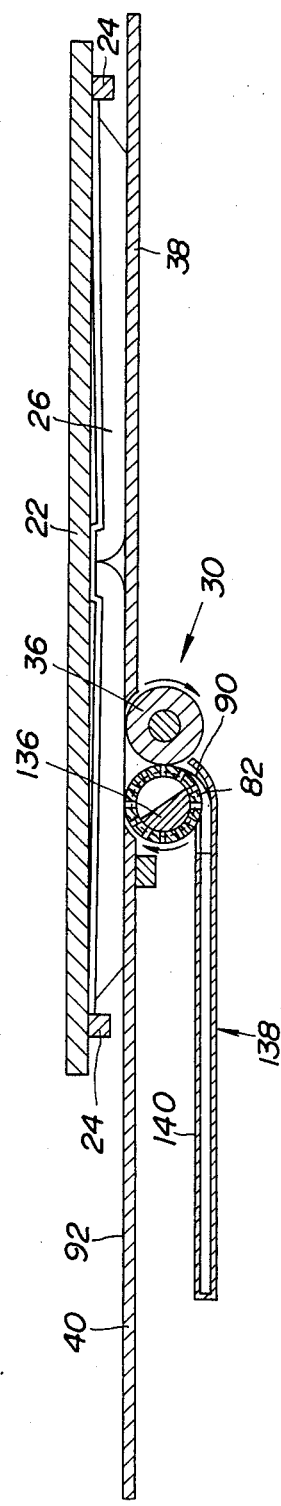

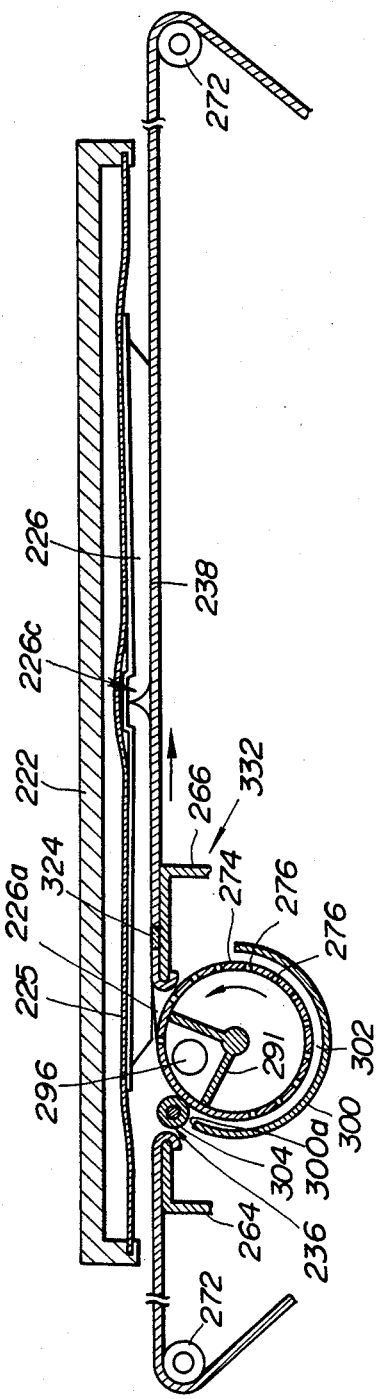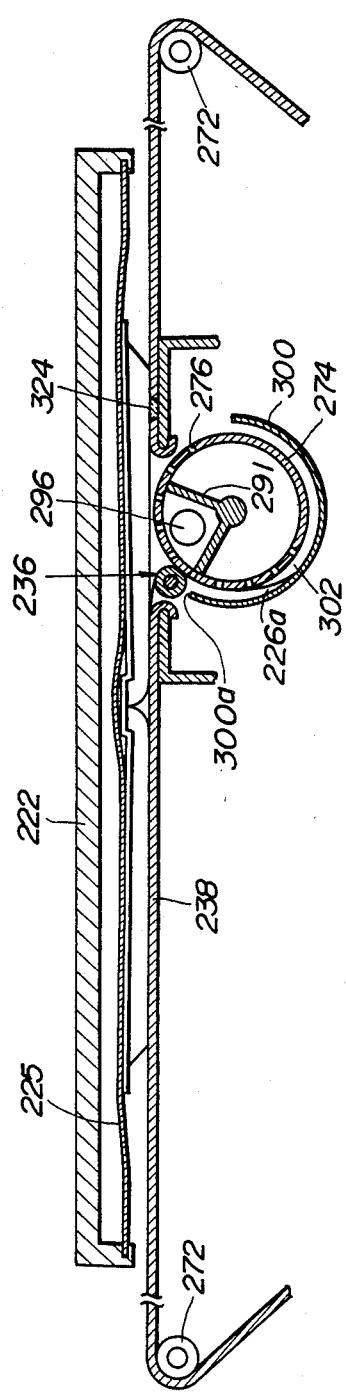

AUTOMATIC PAGE-TURNING DEVICE

BACKGROUND OF THE INVENTION

1. Field of the Invention

The present invention relates generally to an automatic page-turning device, and more particularly is directed to a page-turning device adapted to be employed in an optical reader system, a telecopier machine, a copier machine, a printing apparatus and the like, for automatically turning the pages of a "book" which, in this specification, means any collection of stacked pages fastened together along one edge by bonding, clamping, stapling or the like.

2. Description of the Prior Art

A known automatic page-turning device, for example, as disclosed in Japanese Patent Publication No. 57-208300, published Dec. 21, 1982, employs a carrier roller having a sticky or tacky peripheral surface to which a page of a book to be turned is made to adhere. A stripper member is associated with the carrier roller for stripping the page from the tacky peripheral surface after the page has been turned. In this known page-turning device, some paper fibers from the turned pages continue to adhere to the tacky peripheral surface of the carrier roller. Such paper fibers build up on the roller surface and gradually reduce the tackiness thereof so that the efficiency of the page-turning device is degraded. Furthermore, in this prior art device, the next page, that is, the page following the one being turned, is exposed only after a guide roller grasping the page being turned passes the central juncture of all pages hereinafter referred to as "the spine" of the book. Therefore, until the guide roller of the page-turning device passes the spine of the book, an associated copier, telecopier, optical reader system or printer cannot initiate the reading of the next page. This delay in initiating the reading of the next page significantly lowers the overall efficiency of the known page-turning device and associated copier, telecopier, optical reader system or printer.

OBJECTS AND SUMMARY OF THE INVENTION

Accordingly, it is an object of the present invention to provide an automatic page-turning device which avoids the above-mentioned disadvantages of the prior art.

More specifically, it is an object of this invention to provide an automatic page-turning device which is durable and has a long service life during which it exhibits a relatively high operating efficiency.

Another object of the invention is to provide an automatic page-turning device, as aforesaid, which can relatively rapidly expose succeeding pages of a book for the reading or copying of the information thereon.

Still another object of the invention is to provide an automatic page-turning device, as aforesaid, which can efficiently turn any collection of stacked pages fastened along one edge, as by bonding, clamping, stapling or the like.

A further object of the invention is to provide an optical reading apparatus in which there is incorporated an automatic page-turning device, as aforesaid, so that the optical reading apparatus can automatically read successive pages of a document, book, file and the like without requiring manual turning of the pages thereof.

In accordance with an aspect of this invention, an automatic page-turning device for turning pages of a book or the like as placed in an opened condition to expose a first page to be turned at one side of a spine and a second page in a stack of turned pages at the opposite side of the spine, comprises carrier means, desirably in the form of a cylindrical drum having a perforated peripheral wall, and being bodily movable between a first position in which the carrier means opposes an outer edge portion of the first page, and a second position in which the carrier means opposes an outer edge portion of the second page, means for applying a vacuum to the carrier means in its first position for causing adherence of the first page thereto and the transport of such first page with the carrier means toward the second position, means associated with the carrier means for isolating the first page from the effect of the vacuum during the travel of the carrier means from its first position toward the second position and thereby releasing the first page from the carrier means, page guiding means cooperative with the carrier means and movable therewith for receiving the first page as released from the carrier means and carrying such first page at least until the carrier means passes the spine of the book or the like, and means, desirably in the form of a roller disposed in parallel, closely spaced relation to the cylindrical drum constituting the carrier means, for withdrawing the first page from the page guiding means and stacking the withdrawn page against the second page during final movement of the carrier means to its second position.

In accordance with another aspect of this invention, means are provided for retaining the book in its opened condition at an initially set position, with such book retaining means desirably including a movable component supporting the opened book and being movable with the carrier means, and a stationary component which restricts or prevents movement of the opened book with the movable component. The movable component of the book retaining means may include a pair of rigid board members arranged in spaced apart, coplanar relationship to each other for defining a gap therebetween through which the cylindrical drum constituting the carrier means and the roller constituting the means for withdrawing the first page from the guiding means extend to oppose the opened book. Alternatively, the movable component of the book retaining means may include a flexible belt-like member forming a loop and having spaced apart ends defining the gap therebetween through which the cylindrical drum and roller extend to oppose the opened book.

According to another aspect of the invention, an optical reader system for reading information in a book or the like comprises an automatic page-turning device, as aforesaid, for turning pages of a book or the like as placed in an opened condition to expose a first page to be turned at one side of the spine and a second page in a stack of turned pages at the opposite side of the spine, and an optical reading means disposed for opposing the exposed pages of the opened book and for reading the information thereon.

Preferably, in the optical reader system according to this invention, means are provided for retaining the opened book in an initially set position and include a movable component supporting the book and being movable with the carrier means, and a stationary component which restricts movement of the opened book with the movable component. In such case, the optical reading means is mounted on the movable component of the book retaining means so as to move with such movable component for scanning the first and second pages of the opened book.

It is further a feature of this invention to provide an automatic page-turning device and an optical reader system embodying the same with means for unfolding any folded edges of the pages of the opened book so as to ensure that all information on each page, as exposed, will be fully available for copying or reading.

The above, and other objects, features and advantages of this invention, will be apparent in the following detailed description of illustrative embodiments thereof which is to be read in connection with the accompanying drawings in which the same or corresponding parts are identified by the same reference numerals in the several views thereof.

BRIEF DESCRIPTION OF THE DRAWINGS

FIG. 3 is a front elevational view of the automatic page-turning device of FIG. 1, but with the front wall of its housing removed;

FIG. 4 is a sectional view of the automatic page-turning device take along the line IV—IV on FIG. 1;

FIG. 6 is an enlarged fragmentary section showing an edge unfolding device included in the page-turning device of FIG. 1;

FIGS. 7(A) to 7(D) are schematic sectional views illustrating successive phases in the operation of the automatic page-turning device of FIG. 1;

FIGS. 14(A) and 14(B) are schematic section views showing different operational positions of the page-turning device of FIG. 8.

DESCRIPTION OF THE PREFERRED EMBODIMENT

Figure 1:
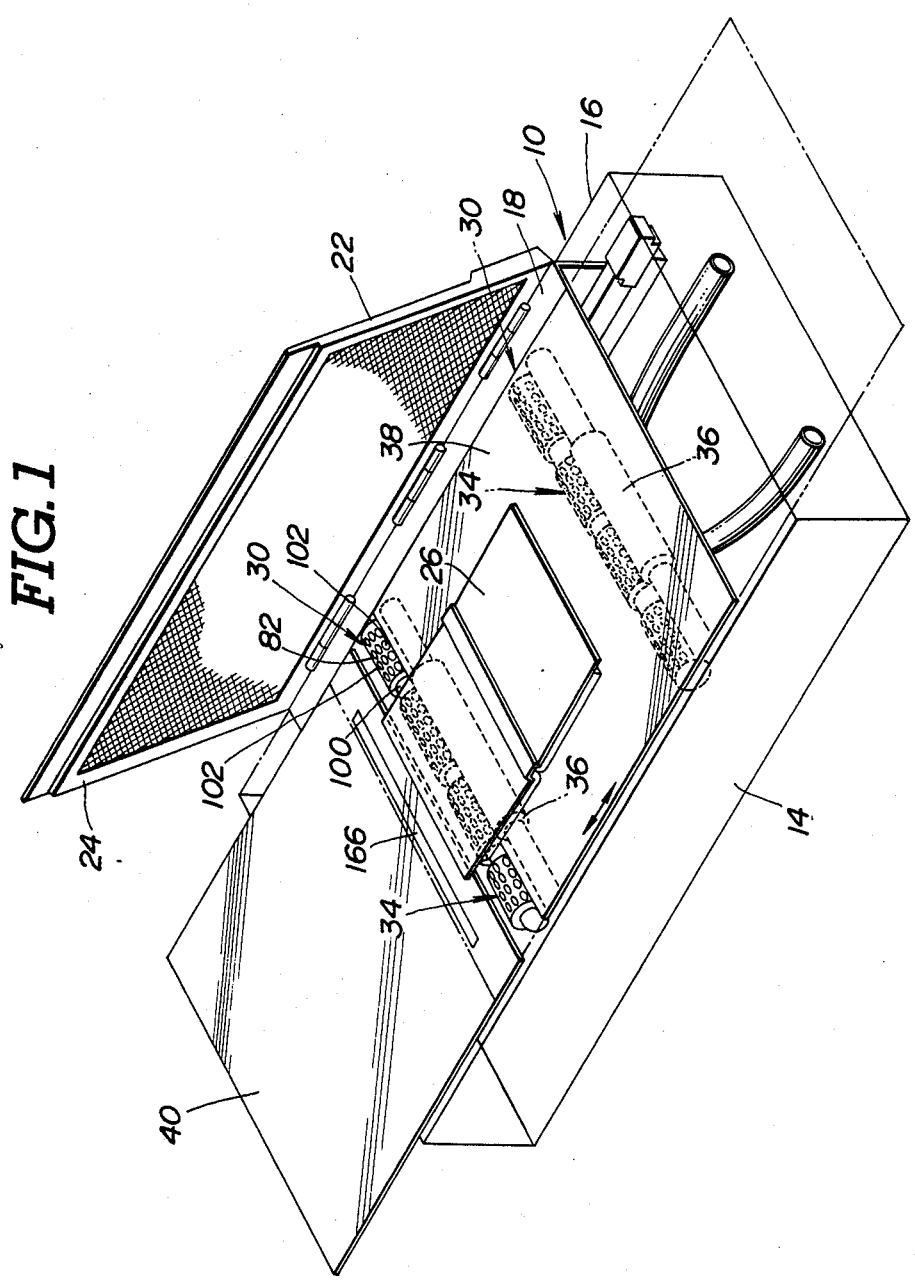
FIG. 1 is a perspective view of an automatic page-turning device according to a first embodiment of the invention.

Referring to the drawings in detail, and particularly to FIGS. 1 to 5, it will be seen that an automatic page-turning device according to a first embodiment of the present invention has a box-shaped housing 10 which includes a bottom wall 12, a front panel 14, a rear panel 16 and a top wall 18. The top wall 18 has a centered square or rectangular opening 20. A book retainer 22 is hinged along the rear edge of opening 20 in top wall 18. The book retainer 22 is essentially the same size as or slightly smaller than opening 20. As best shown in FIG. 3, book retainer 22 has downwardly projecting strips 24 along its opposite side edges. The strips 24 serve to restrict lateral movement of an opened book 26 during a page-turning operation.

In order to hold book 26 in place within the device, book retainer 22 exerts a substantial, downwardly directed biasing force on the opened book. The strips 24 may be suitably laterally movable toward and away from each other so as to adjust the spacing therebetween for accommodating books of various sizes. The strips 24 may be associated with suitable fastening means (not shown) for securing the strips at their selected positions.

A page-turning assembly generally represented by reference numeral 30 is disposed within housing 10. The page-turning assembly 30 generally comprises a movable frame 32, a carrier drum assembly 34, a guide roller 36 and book supports 38 and 40. The carrier drum assembly 34, guide roller 36 book supports 38 and 40 are all mounted on movable frame 32.

Figure 2:
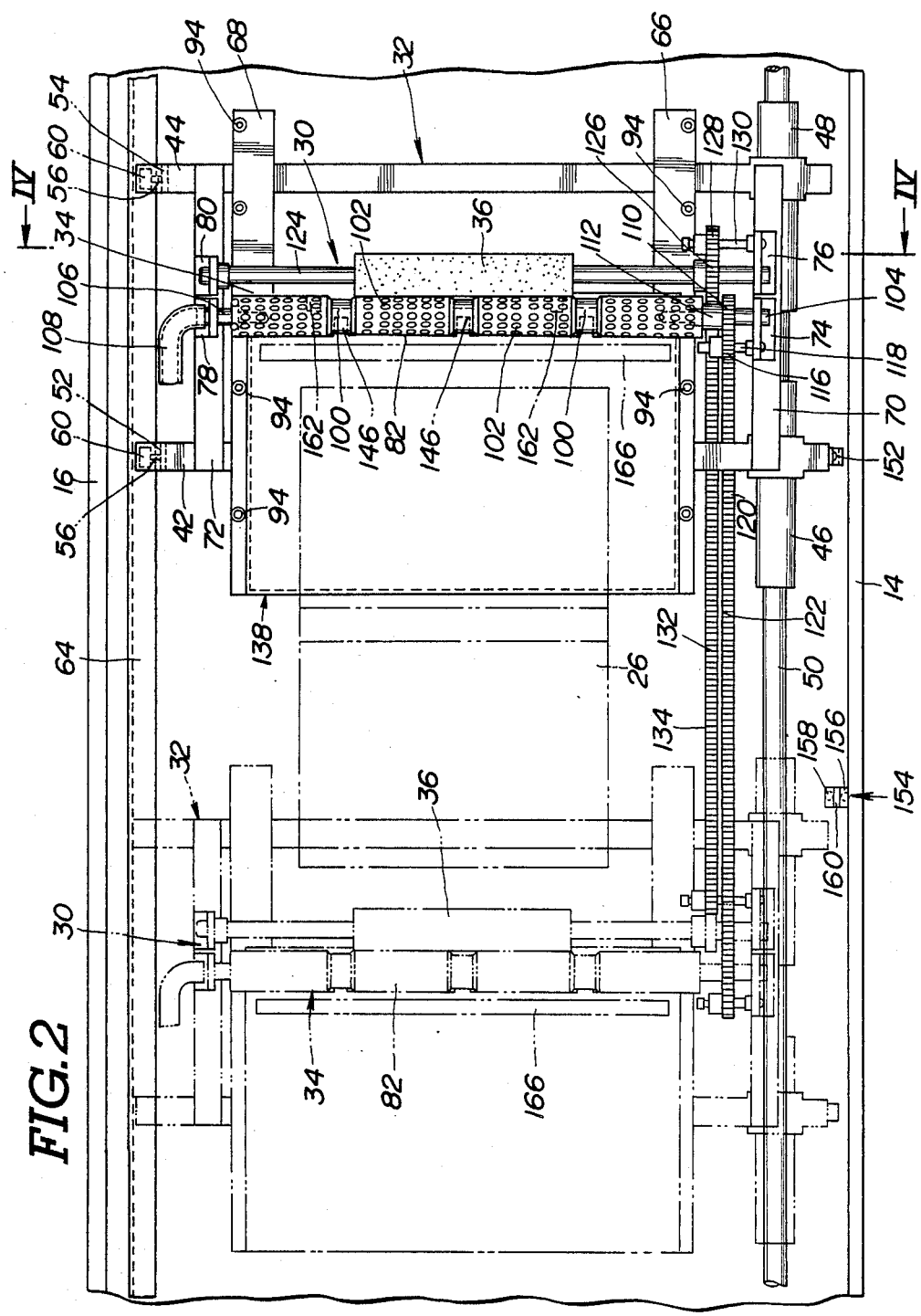
FIG. 2 is a top plan view of the automatic page-turning device of FIG. 1, but with components of a book retaining assembly removed to better show other components of the device.

The movable frame 32 is shown to include a pair of elongated parallel frame members 42 and 44 laterally spaced apart from each other. The frame members 42 and 44 have coaxial cylindrical sections 46 and 48 extending laterally at their front ends. The cylindrical sections 46 and 48 slidingly receive a guide bar 50 which extends laterally across housing 10 adjacent the front of the latter. Cut-outs 52 and 54 in the rear ends of frame members 42 and 44 accommodate horizontal stub-shafts 56 and 58, respectively, on which rollers 60 and 62 are rotatably supported (FIGS. 2 and 4). The guide rollers 60 and 62 engage and ride on the upper horizontal section of an essentially channel-shaped, laterally extending guide rail 64 having its lower horizontal section fixed to bottom wall 12.

A pair of lateral, spaced apart frames 66 and 68 are mounted on, and extend between frame members 42 and 44. The left-hand ends of lateral frames 66 and 68 protrude from the left-side frame member 42. Similarly, the right-hand ends of lateral frames 66 and 68 protrude beyond the right-side frame member 44. Cross members 70 and 72 extending between frame members 42 and 44 lie parallel to lateral frame members 66 and 68. The cross member 70 nearer lateral frame 66 lies in front of the latter. On the other hand, the cross member 72 nearer lateral frame 68 lies behind it. Pairs of mounting brackets 74,76 and 78,80 are mounted near the centers of cross members 70 and 72, respectively. The mounting brackets 74 and 78 are essentially in alignment with each other along a longitudinal axis and rotatably support a carrier drum 82 of the carrier drum assembly 34, which will be described later. Similarly, mounting brackets 76 and 80 are essentially aligned with each other along a longitudinal axis and are designed to rotatably support guide roller 36 which will be further described later.

A drive wire 86 situated beneath guide bar 50 extends parallel to the latter (FIG. 3). The drive wire 86 is wound around a drive pulley (not shown) and responds to a driving force transmitted from a driving motor (not shown) through the drive pulley. The drive wire 86 is connected to a downward extension 88 of cylindrical section 46 of frame member 42. Therefore, drive wire 86 drives movable frame 32 along guide bar 50 in response to the driving force.

The drive motor used to drive the drive wire 86 should be a reversible motor so as to be capable of driving movable frame 32 in either direction along guide bar 50. It should be appreciated that movable frame 32 is designed to move between a first position, shown in full lines on FIGS. 2 and 3, and in which carrier drum 82 opposes the free outer edge of a page 90 of the book 26 to be turned, and a second position, shown on dot-dash lines on FIGS. 2 and 3, and in which the carrier drum opposes the other outer edge of the book. During movement of movable frame 32 from the first position to the second position, the page 90 is turned, that is, flipped over to the side of opened book 26 to which previously scanned pages are relegated. This direction of travel of movable frame 32 will be hereafter referred to as the "page-turning direction". On the other hand, the direction of travel of movable frame 32 from the second position to the first position will be referred to as the "return direction".

The movable frame 32 also carries the book supports 38 and 40 in the form of flat plates or boards mounted on respective supporting extensions 94 extending upwards from the lateral frames 66 and 68. The flat plates 38 and 40 are rigid and co-planar to define a flat book supporting plane 92. The book supporting plates 38 and 40 have mutually opposing lateral edges which are separated to define a gap 96 therebetween. The gap 96 serves to expose carrier drum 82 and guide roller 36. The flat plates 38 and 40 are fixed to extensions 94 by means of fastening screws 98 and thus move with frame 32 in the page-turning direction and the return direction between the aforementioned first and second positions. The gap 96 between plates 38 and 40 is disposed so that, when the opened book 26 is mounted under retainer 22, flat plate 40 opposes, or is under book retainer 22 at the first position of movable frame 32. On the other hand, at the second position of movable frame 32, flat plate 38 opposes book retainer 22.

Figure 5:
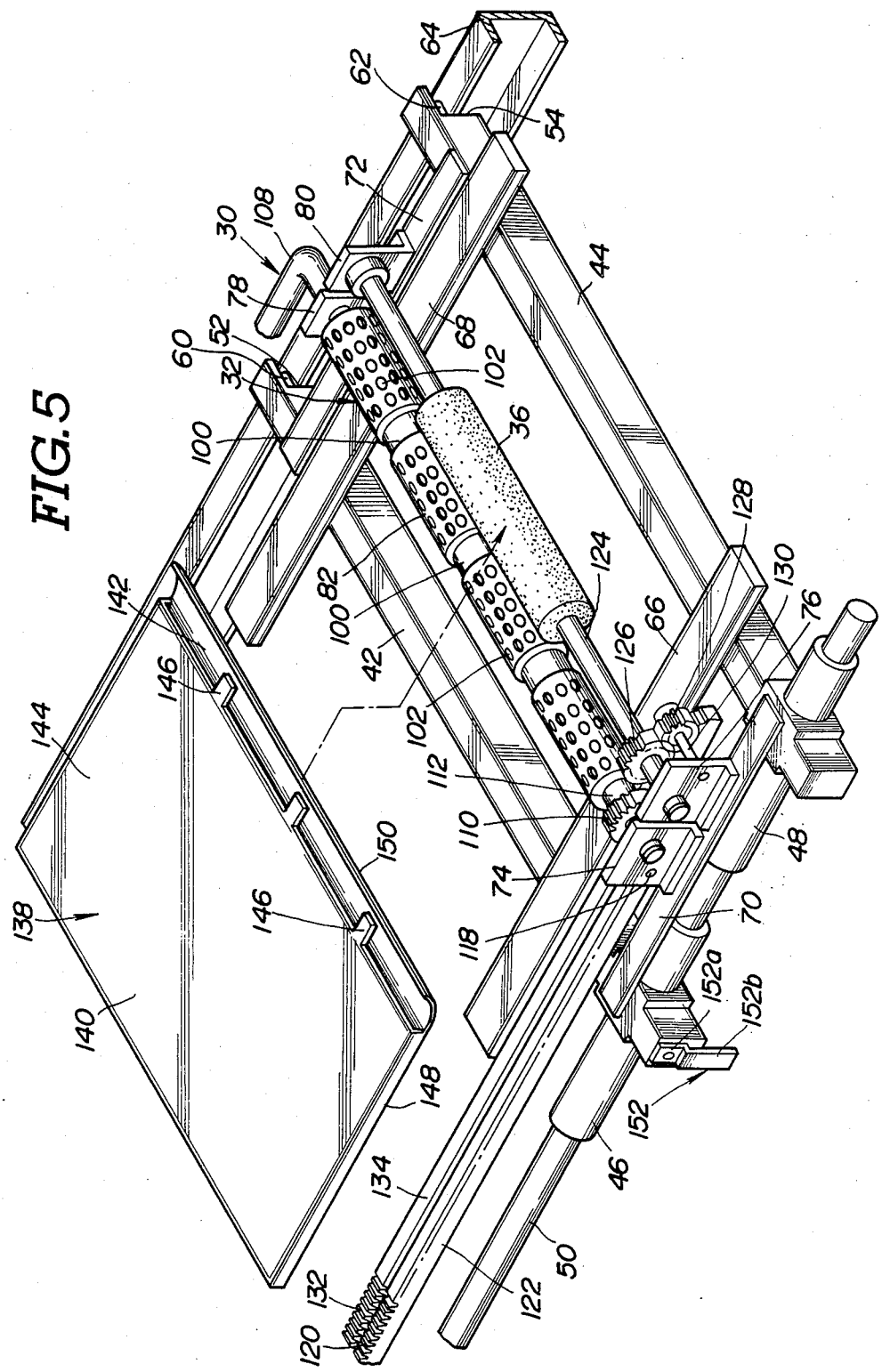
FIG. 5 is an enlarged perspective view of a major sub-assembly of the automatic page-turning device of FIG. 1.

Carrier drum 82 is generally in the form of a hollow cylinder, and thin grooves 100 encircle such cylinder at suitable intervals, as shown particularly on FIGS. 4 and 5. A plurality of through openings 102 pierce the remaining lands of carrier drum 82, thereby establishing communication between the inside and outside of the drum. Support shafts 104 and 106 (FIG. 2) extend longitudinally from the opposite ends of carrier drum 82 so as to engage mounting brackets 74 and 78 and thus rotatably support carrier drum 82. The support shaft 104 extending from the front end of carrier drum 82 is solid, while the other rotary shaft 106 has a hollow cylindrical construction to define an internal space in communication with the interior of carrier drum 82. The rear end of rotary shaft 106 is connected to a vacuum tube 108 which is connected in turn to a vacuum pressure source, such as a vacuum generator (not shown).

A gear 110 with a boss section 112 is rotatably mounted on support shaft 104. The boss section 112 of gear 110 is secured to the front end of carrier drum 82 so that the carrier drum and gear 110 rotate together.

In order to rotatably support the front end of carrier drum 82 on support shaft 104, the latter engages in a bearing (not shown) mounted at the front end of the drum. Similarly, support shaft 106 engages in a bearing (not shown) mounted at the rear end of carrier drum 82 so as to rotatably support the rear end of the drum.

The gear 110 engages a smaller diameter gear 116 (FIG. 2) which is rotatably supported on a gear shaft 118 extending from mounting bracket 74. The gear 116 engages rack teeth 120 formed on the upper surface of a rack plate 122 extending parallel to guide bar 50. The length of rack plate 122 corresponds to the travel of movable frame 32 between the first and second positions. The rack plate 122 is located behind guide bar 50 and slightly higher than frame member 33, and is fixed to housing 10 by means of rack supports (not shown). Engagement of rack teeth 120 with smaller diameter gear 116 enables gear 110 to rotatably drive carrier drum 82 in synchronism with the travel of movable frame 32 in the page-turning direction and the return direction.

Guide roller 36 opposes carrier drum 82 and is supported by means of a rotary shaft 124 extending parallel to the axis of drum 82 and rotatably engaging in mounting brackets 76 and 80. Guide roller 36 is made of an elastically deformable material, such as rubber, and has an external diameter essentially corresponding to the external diameter of carrier drum 82. On the other hand, guide roller 36 is axially shorter than carrier drum 82, and is longitudinally centered between the front and rear ends of the rotary shaft 124. The outer peripheral surface of guide roller 36 is slightly separated from the opposing surface of carrier drum 82 at the portions of the latter between grooves 100. Such spacing between the peripheral surfaces of guide roller 36 and carrier drum 82 is sufficient to allow only page 90 to be turned to pass therethrough, but is narrow enough to prevent any extra pages from passing therethrough. The uppermost portion of guide roller 36 protrudes slightly upwards through gap 96 between flat plates 38 and 40 of the book support.

A gear 126 is fixed to rotary shaft 124 for rotation therewith, and gear 126 engages a smaller diameter gear 128 which is rotatably supported by means of a gear shaft 130 extending from mounting bracket 76. The smaller diameter gear 128 in turn engages rack teeth 132 of a rack plate 134 which extends parallel to rack plate 122.

The guide roller 36 is designed so that any extra pages that happen to adhere to carrier drum 82 are returned by guide roller 36 to the stack of pages which are yet to be read or scanned. Therefore, guide roller 36 normally rests against the pages of the book with a predetermined friction which is not so great that it interferes with the turning of page 90 by carrier drum 82 but should be sufficient to prevent the pages following that page being turned from adhering to carrier drum 82 together with the subject page.

A closure or valving member 136 (FIGS. 7A-7D) is disposed within carrier drum 82, and is shown to be cross-sectionally of semi-circular configuration with a radius essentially equal to the internal radius of carrier drum 82 so that it firmly contacts the internal periphery of the carrier drum. Closure or valving member 136 extends axially through at least most of carrier drum 82 and is designed to selectively seal off through openings 102 by covering the latter at the inner periphery of the carrier drum.

The closure member 136 is non-rotatably supported by an appropriate support means (not shown) within the interior of carrier drum 82 so that its flat surface is inclined relative to the horizontal plane. Preferably the inclined flat surface of non-rotatable closure member 136 lies in a plane defined by the proximal longitudinal edge of flat plate 40 and the central axis of carrier drum 82, as shown in FIGS. 7A–7D.

A page guiding member 138 adjoins carrier drum 82. The page guiding member 138 serves to strip the page 90 from the surface of carrier drum 82 and to guide such page to the stack of turned page 91 as movable frame 32 moves in the page-turning direction.

The page guiding member 138 (FIG. 5) has a major section 140 with a thin box-shaped configuration having a longitudinally elongated rectangular cross-section. The dimension of major section 140 in the direction of the axis of carrier drum 82 essentially matches the overall length of the carrier drum but is slightly shorter than the latter. The aforementioned box-shaped major section 140 of page guiding member 138 has an opening 142 in the lateral side nearest carrier drum 82. A plurality of strip-shaped extensions 146 extend toward carrier drum 82 from the lateral edge of the top wall 144 of major section 140. The free ends of extensions 146 reach into thin grooves 100 in carrier drum 82 across a small gap. The extensions 146 engage the carrier drum 82 in this way only at locations where closure member 136 closes openings 102.

A curved lip 150 extends toward carrier drum 82 from the edge of the bottom wall 148 of guide member 138 nearest carrier drum 82. The curved lip 150 is essentially concentric with carrier drum 82. The free edge of lip 150 is slightly higher than top wall 144.

A photo-insulator member 152 is fixed to frame member 42 of movable frame 32 for lateral movement therewith. The photo-insulator member 152 is essentially crank-shaped and has an upper section 152a and an offset lower section 152b. The upper section 152a is secured to the front end of frame member 42, and lower section 152b extends downward therefrom. Such lower section 152b is vertically positioned so as to cooperate with a photo-sensor 154 secured to the inner surface of front panel 14 of housing 10. The photo-sensor 154 is generally U-shaped or channel-shaped and has a light emitter 156 and a light receiver 158 opposing each other. A path 160 for the photo-insulating plate 152 is defined between light emitter 156 and light receiver 158.

The photo-sensor 154 is so located that photo-insulating plate 152 interrupts the light from light emitter 156 as carrier drum 82 passes across the spine of the opened book 26. Such carrier drum position corresponds to a halfway point of the travel of the movable frame between the first and second positions.

The photo-sensor 154, when blocked by photo-insulating plate 152, generates a carrier drum position-indicating signal for activating and deactivating the vacuum generator. More specifically, when photo-sensor 154 is interrupted during travel of movable frame 32 in the page-turning direction, the vacuum generator is deactivated in response to the carrier drum position-indicating signal.

Two or more strips 162 (FIG. 6) are pivotally supported at one end by a rod 164 between carrier drum 82 and guide roller 36, with the ends of rod 164 being rotatably supported by mounting brackets 74 and 78. When there are more than two strips 162 they are spaced apart at regular intervals along rod 164. The strips 162 are pivotable between a first position (shown in full lines on FIG. 6) in which they lean toward carrier drum 82 and a second position (shown in dot-dash line) in which they lean toward guide roller 36. Free end surface portions of strips 162 loosely contact the surface of carrier drum 82 or of guide roller 36 in the first and second positions, respectively. In either position, the upper edges of strips 162 project slightly above the surface of the book-support plane 92 defined by book support plates 38 and 40 so as to be engageable with the pages of book 26.

As movable frame 32 moves in the page-turning direction indicated by the arrow 162a on FIG. 6, strips 162 in the first position contact the right-hand margin of the book and are thus pivoted to the second position shown in dot-dash lines at 162'. In this second position, the upper edges of strips 162' ride across the surface of page 90 to be turned and the surface of the last turned page 91. If the left-hand margin of the page 91 is creased or folded, each strip 162 unfolds such page 91 to make the full page legible for reading or copying. On the other hand, when movable frame 32 travels in the return direction, strips 162' abut the right-hand margin of the book and thereby are pivoted back to the first position indicated in full lines at 162 on FIG. 6. With strips 162 in the position shown in full lines, if the right-hand margin of page 90 is folded, as at 90a, it can be unfolded by the effect of strips 162.

An optical reading means 166 (FIGS. 1 and 2) scans the pages of the book for reading the information therein. The optical reading means 166 is mounted on the lower surface of flat plate 40 of the book support. The flat plate 40 should be transparent at least at the section where optical reading means 166 is mounted to allow the latter to read the information from the pages of the supported book. Toward this end, flat plate 40 is made of a transparent material, or has a transparent window opposite optical reading means 166.

The optical reading means 166 can be a CCD line sensor or the like, which is appropriate for optically reading information from the pages of a book. The optical reading means 166 is located near carrier drum 82 so that the optical reading means moves in advance of carrier drum 82 during page-turning movement. With this arrangement, optical reading means 166 can read information from page 90 before that page is picked up by carrier drum 82 and turned to the stack of previously turned pages.

In the alternative, optical reading means 166 can be a reflector mounted on the lower surface of plate 40 to reflect an image of the page to a CCD line sensor through an optical system, such as, a self-focusing lens alley.

The operation of the above-described embodiment of a page-turning device according to the present invention, will now be described with reference to FIGS. 7(A) to 7(D).

In the initial or first position of the movable frame 32 at the start of a page-turning operation, as shown in full lines on FIG. 3, the page-turning assembly 30 is offset somewhat toward the right from the position shown on FIG. 7A. In any case, a detector (not shown) may detect when movable frame 32 is in such first position, and, in response thereto, the vacuum generator generates a vacuum applied through vacuum tube 108 to the interior of carrier drum 82. At the same time, drive wire 86 is made to drive movable frame 32 in the page-turning direction to dispose carrier drum 82 at the position shown in FIG. 7(A). In such position, carrier drum 82 picks up or adheres to the right-hand edge of page 90 of the book as a result of the action at openings 102 of the vacuum within drum 82. In synchronism with movement of movable frame 32 in the page-turning direction, carrier drum 82 and guide roller 36 which also move bodily in the page-turning direction, are rotated in the clockwise direction by engagement of gears 110,116 and rack teeth 120 of rack plate 122, and by engagement of gears 126,128 and rack teeth 132 of rack plate 134.

Clockwise rotation of carrier drum 82, as viewed on FIG. 7(A), causes successive portions of page 90 to be drawn or wound around carrier drum 82. Further travel of movable frame 32, and consequent turning of carrier drum 82, brings the part of the carrier drum holding the right-hand edge of page 90 to a point opposite closure member 136. Thereafter, in response to further turning of drum 82, closure member 136 closes the through openings 102 in carrier drum 82 underlying the right-hand edge portion of page 90 so that such edge portion becomes free of the vacuum force. Further travel of assembly 30 in the page-turning direction and thus further clockwise rotation of drum 82, increasingly frees the rest of page 90 from the action of the vacuum in the interior of carrier drum 82. The progressively increasing part of the page becoming free of the effect of vacuum is guided into the internal space of page guiding member 138 through the opening 142, as shown in FIG. 7(B). At this time, the extensions 146 of the ceiling 144 of the major section 140 act to strip page 90 away from the surface of carrier drum 82.

Further travel of the movable frame 32 in the page-turning direction brings carrier drum 82 opposite the spine of the book 26, as shown on FIG. 7(C). Such position of carrier drum 82 opposite the spine of book 26 is detected by photo-sensor 154 producing a signal for terminating driving of the vacuum generator. Therefore, the suction of the periphery of carrier drum 82 disappears. This permits page 90 wrapped on the outer periphery of carrier drum 82 to be free of any adherence thereto.

As movable frame 32 moves further toward the second position together with carrier drum 82 and guide roller 36, page 90 is withdrawn from page guiding member 138 by the effect of guide roller 36 and reverted under the stack of turned pages of the book, as shown in FIG. 7(D). After completing the disposition of the turned page under the stack of turned pages, movable frame 32 reaches its second position shown in broken lines on FIG. 3. The arrival of frame 32 at the second position is detected by an appropriate detector (not shown) which produces an appropriate detector signal for reversing the driving direction of the motor for driving drive wire 86.

In response to operation of the driving motor in the reverse direction, movable frame 32 is driven in the return direction to its first position. During this travel, since the vacuum generator is maintained inoperative and thus no vacuum is generated, the pages of book 26 are not attracted to the outer periphery of carrier drum 82. Thus, movable frame 32 and the carrier drum 82 and guide roller 36 thereon are returned to the first position to be ready for next page turning operation. The return of movable frame 32 to the first position may be detected by means of the aforementioned detector.

During the travel of movable frame 32, carrier drum 82 and guide roller 36 in the page turning direction and return direction, strips 162 moved therewith are active for unfolding the side edge portions of the pages that may have been creased or folded, as set forth above. Similarly, optical reading means 166 is shifted with movable frame 32, and hence with carrier drum 82 and guide roller 36, and reads information on pages 90 and 91, as set forth above. The optical reading means 166 generates data signals representative of the read information on pages 90 and 91 and such data signals are supplied to an associated device, such as a copier machine, telecopier machine, optical reading system, printer or the like.

Referring to FIGS. 8 to 14(A) and 14(B), it will be seen that an automatic page-turning device according to a preferred second embodiment of the present invention has a square or rectangular box-shaped housing 210 including a bottom wall 212, a front panel 214, a rear panel 216 and a pair of side walls 218. The housing 210 has an essentially square or rectangular top opening 220. A book retainer 222 is hinged along the upper edge of rear panel 216 and is essentially the same size as, or slightly smaller than the opening 220. The book retainer 222 has a downwardly projecting peripheral edge 224. A friction member 225 is stretched across peripheral edge 224, and is made of relatively flexible and high friction material. In the illustrated embodiment, in order to provide sufficient friction, friction member 225 is in the form of a sheet with a meshed surface for opposing a book 226. The friction member 225 thus serves to restrict lateral movement of book 226 during the page turning operation. The book retainer 222, when closed, exerts a predetermined downwardly directed biasing force on the book so as to assure restriction of the lateral movement of the book 226.

A page turning assembly generally represented by reference numeral 230 is disposed within housing 210, and generally comprises a movable chassis 232, a carrier drum assembly 234, a guide roller assembly 236 and a book support assembly 238. The carrier drum assembly 234 and guide roller assembly 236 are mounted on movable chassis 232.

Figure 8:
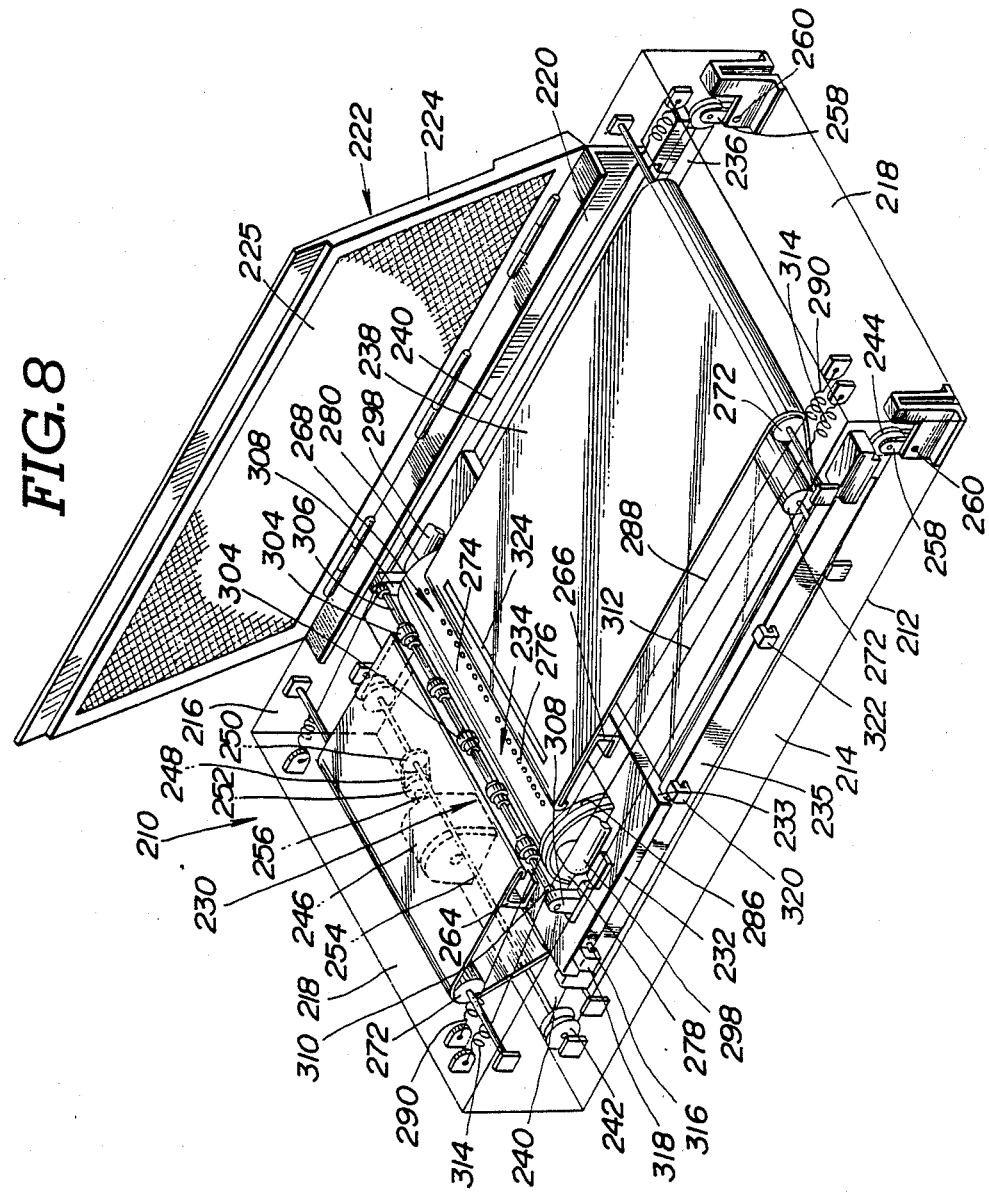
FIG. 8 is a perspective view of an automatic page-turning device according to a second embodiment of the invention.
Figure 10:
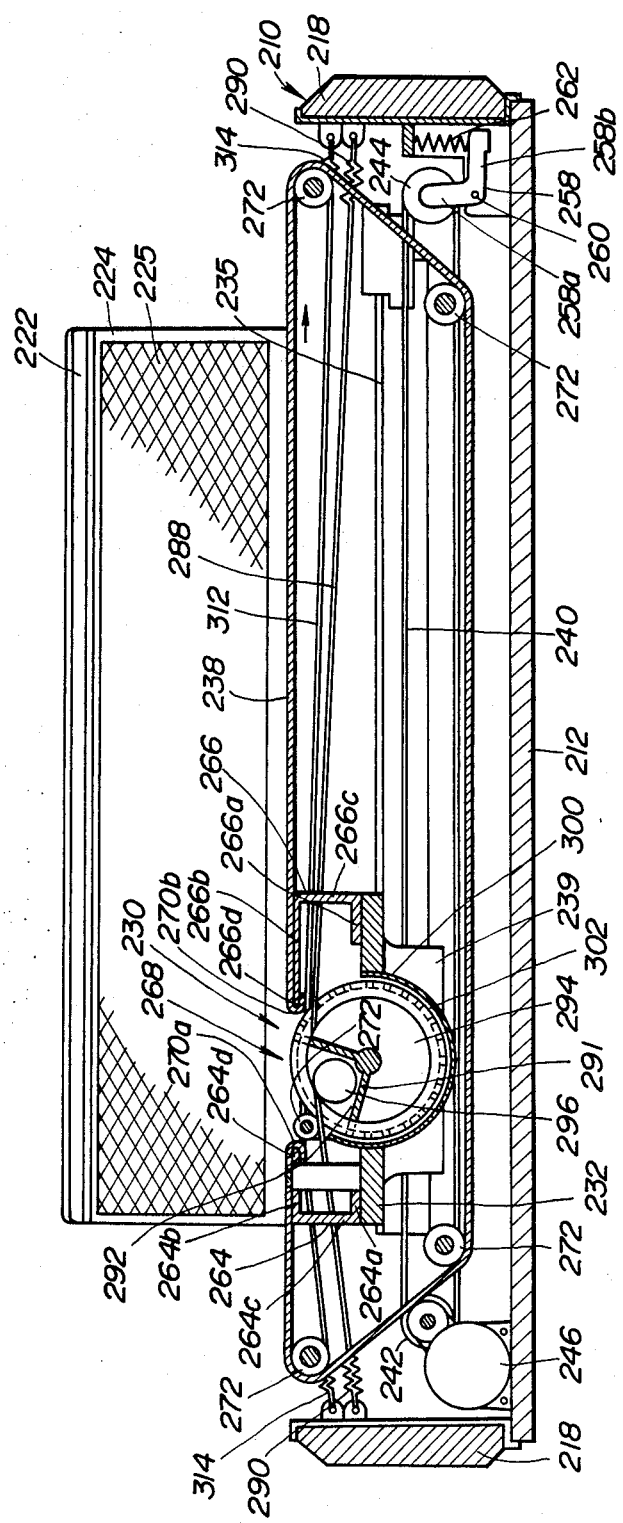
FIG. 10 is a sectional view taken along the line X—X on FIG. 9.
Figure 11:
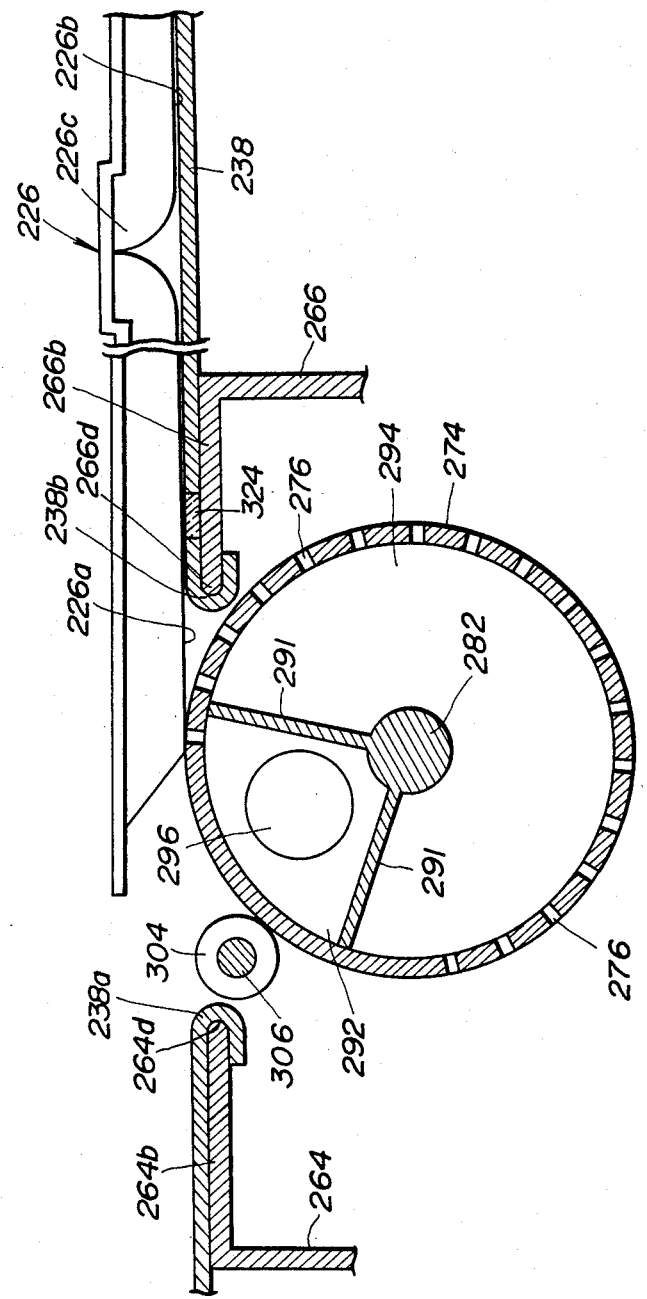
FIG. 11 is an enlarged fragmentary sectional view showing details of the structure around a carrier drum in the automatic page-turning device of FIG. 8.
Figure 12:
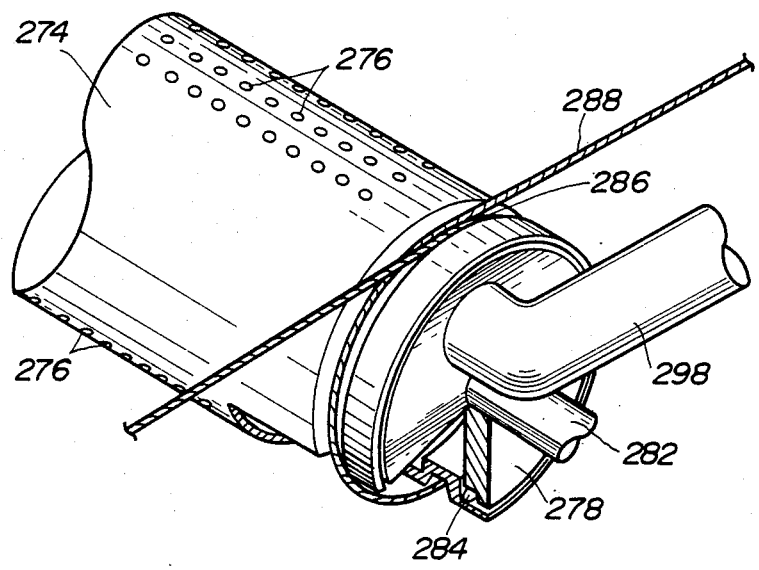
FIG. 12 is an enlarged partial perspective view of the carrier drum in the automatic page-turning device of FIG. 8.

The movable chassis 232 has laterally extending grooves 233 in its lower surface adjacent the front and rear edges thereof. The grooves 233 are slidingly engageable with guide rails 235 which extend laterally along, and are secured to front and rear panels 214 and 216 of the housing. The movable chassis 232 also has a downward extension 239 (FIG. 10). The opposite ends of drive wires 240 are both connected to downward extension 239 of movable chassis 232. Therefore, drive wires 240 form endless loops together with the downward extension 239 of the movable chassis 232. The looped drive wires 240 are wound around drive pulleys 242 and idler pulleys 244. The drive pulleys 242 are driven by a reversible step motor 246 through a driving belt 248 stretched between belt pulleys 250 and 252 (FIG. 8). The belt pulley 250 is secured to a longitudinally extending shaft 254 on which drive pulleys 242 are also secured for rotation therewith. On the other hand, belt pulley 252 is secured to a drive shaft 256 of step motor 246.

In the illustrated embodiment, several turns of drive wires 240 are wound around drive pulleys 242 for assuring transportation of the driving force to the latter. On the other hand, idler pulleys 244 are supported by support levers 258 of essentially L-shaped configuration. Each of support levers 258 has a vertically extending section 258a rotatably supporting the corresponding idler pulley 244 and a horizontally extending section 258b. The support lever 258 is pivotably supported on a pivot pin 260 between the vertically extending section 258a and the horizontally extending section 258b. The horizontally extending section 258b is associated with a tension control spring 262 which constantly downwardly biases the horizontally extending section 258b with a predetermined spring force. Thus, support lever 258 is normally biased in clockwise direction in FIG. 10 and thereby provides the respective drive wire 240 with a predetermined tension.

A pair of frame members 264 and 266 of essentially C-shaped cross-section are secured on the upper surface of movable chassis 232 adjacent the side edges of the latter. The frame members 264 and 266 have lower horizontal sections 264a and 266a respectively secured on the upper surface of movable chassis 232. The members 264 and 266 also have upper horizontal sections 264b and 266b, respectively, extending toward each other substantially parallel to the upper surface of movable chassis 232, and vertical sections 264c and 266c extending between the upper and lower horizontal sections 264a, 264b and 266a,266b. The opposing edges 264d and 266d of upper horizontal sections 264b and 266b are spaced apart from each other to define therebetween a clearance or gap 268.

One end 238a of book support 238 in the form of a flexible belt is turned around edge 264d of the upper horizontal section 264b of frame member 264 and fixed thereto. The other end 238b of book support belt 238 is turned around the edge 266d of upper horizontal section 266b of frame member 266. As noted, book support 238 is made of a flexible material, such as, a flexible belt of glass fiber, aramid fiber and the like. The book support belt 238, as secured to frame members 264 and 266 as set forth above, forms a loop. The looped book support 238 is supported by means of guide rollers 272 in a stretched form with a tension sufficient for supporting book 226 thereon.

Figure 9:
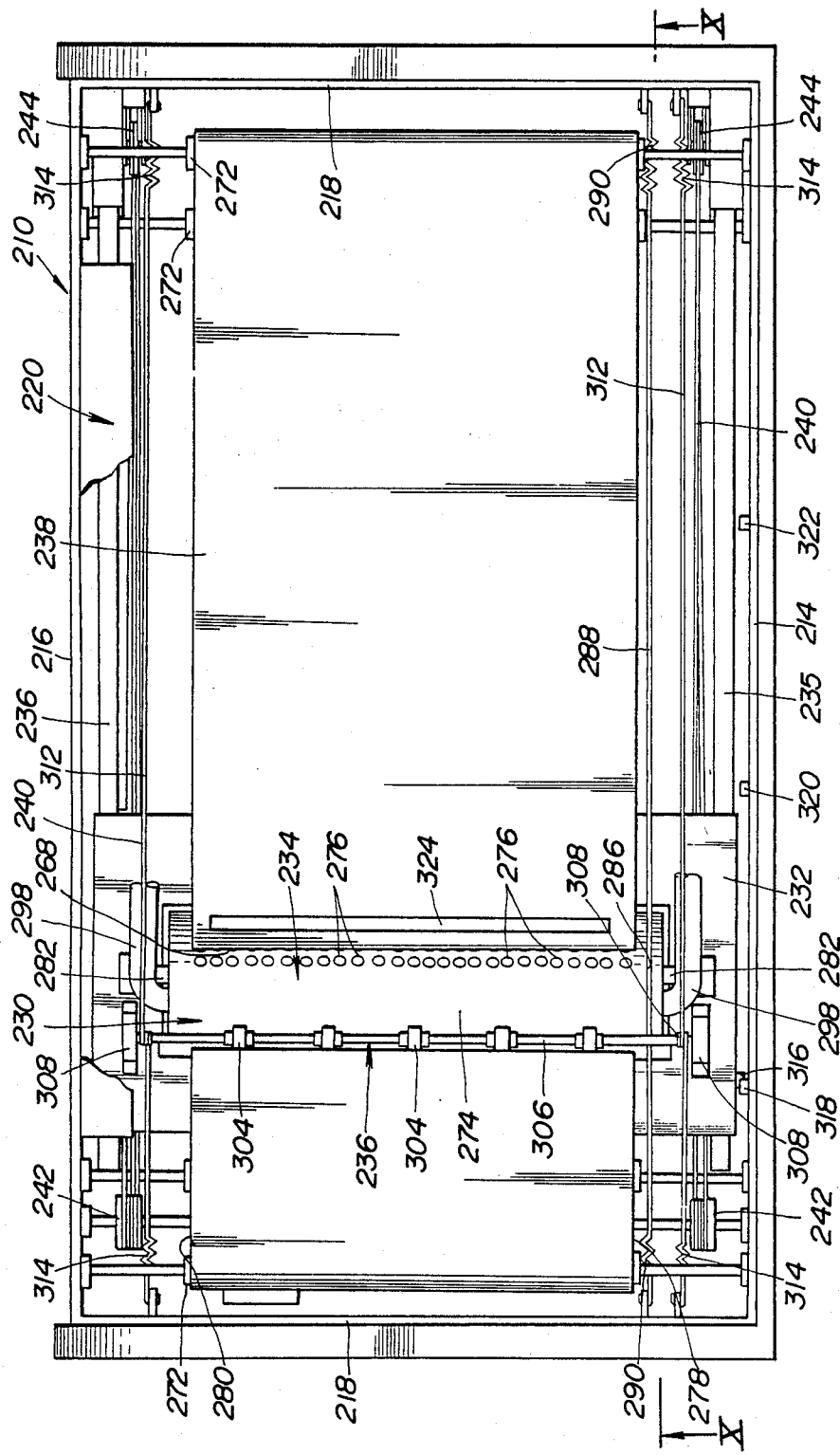
FIG. 9 is a plan view of the automatic page-turning device of FIG. 8.

It should be appreciated that movable chassis 232 is designed to move between a first position shown on FIGS. 8–10 and a second position displaced substantially to the right therefrom. During movement of movable chassis 232 from the first position to the second position, page 226a of book 226 is turned, that is, flipped over to the side of the opened book 226 to which previously scanned pages are relegated. Here again, this direction of travel of movable chassis 232, which is toward the right on FIGS. 8–11 and 14(A),14(B), will be hereafter referred to as the "page turning direction". On the other hand, the direction of travel of movable chassis 232 from the second position to the first position, that is, toward the left, will be referred to as the "return direction".

Since the book support 238 in the form of a belt loop is fixed to members 264 and 266 on movable chassis 232, the book support is also driven in the page turning direction and the return direction together with the movable chassis. The book 226 mounted on book support 238 is restricted against movement with the book support by means of book retainer 222. Therefore, even when book support 238 is driven either in the page turning direction or in the return direction, book 226 is held in place by book retainer 222. In order that book support 238 may slip in the page turning direction or return direction with reference to the book 226 held in place, the surface of book support 238 engageable with pages 226a and 226b of the book 226 is preferably provided with a smoothing treatment, such as, a Teflon (trademark) treatment. In the alternative, it would be possible to provide some kind of low friction bearing means (not shown), such as, bearing rollers on the surface of the book support 238 so as to reduce friction between the mating surfaces of the book support and the book pages, thereby to facilitate maintaining the book in place.

A carrier drum 274 of carrier drum assembly 234 extends into gap or clearance 268 formed between the opposing edges 264d and 266d of upper horizontal sections 264b and 266b. The carrier drum 274 is generally in the form of a hollow cylinder, with a plurality of lines or rows of through openings 276 in the peripheral wall of carrier drum 274, thereby establishing communication between the inside and outside of the drum. The lines of through openings 276 are arranged in a predetermined area of the carrier drum periphery. The front and rear ends of carrier drum 274 are closed by front and rear plates 278 and 280, respectively, which are secured to a support shaft 282 extending longitudinally. The opposite ends of support shaft 282 are suitably secured to movable chassis 232. Therefore, the carrier drum 274, as supported by support shaft 282, moves in the page-turning direction and return direction according to the movement of movable chassis 232. Bearings, such as, ball bearings 284, are disposed between racelike peripheries of the front and rear plates 278 and 280 and the mating inner peripheral surfaces of drum 274 at the front and rear ends of the carrier drum (FIG. 12) for allowing rotational movement of carrier drum 274 about front and rear end plates 278 and 280. The carrier drum 274 is formed with an outwardly opening peripheral groove 286 adjacent the front end thereof. One or more turns of a drum drive wire 288 are wound around the peripheral groove 286, and the ends of drum drive wire 288 are secured to the inner periphery of side walls 218 via resilient springs 290. The resilient springs 290 provide a predetermined tension to drum drive wire 288 to establish frictional engagement of the latter in peripheral groove 286. This frictional engagement between drum drive wire 288 and peripheral groove 286 causes rotation of carrier drum 274 upon bodily movement thereof in the page turning direction and the return direction with the movable chassis 232.

In the illustrated embodiment, the internal space of carrier drum 274 is partitioned by means of angularly spaced partitions 291 in order to define a vacuum chamber 292 therebetween. The partitions 291 are radially extended and angled about 90° with respect to each other. The partitions 291 are fixed to support shaft 282 in a position directing the vacuum chamber 292 essentially upwardly toward gap or clearance 268. The remaining internal area 294 outside of vacuum chamber 292, and which has an angular extent of 270°, is maintained substantially at atmospheric pressure. The carrier drum 274 is rotatable in respect to partitions 290 while maintaining air-tight contact between the inner periphery of drum 274 and the outer edges of partitions 291.

The front and rear end plates 278 and 280 are formed with through openings 296 (FIGS. 10,14A and 14B) at a position corresponding to vacuum chamber 292. The through openings 296 are communicated with a vacuum generator, such as, a vacuum pump (not shown), through vacuum hoses 298 which are made of flexible material.

An arcuate page guiding member 300 (FIGS. 10,14A and 14B) is provided to surround approximately the lower half of carrier drum 274 with a radial clearance therebetween serving as a page receiving space 302. The page guiding member 300 has a concentric curvature with carrier drum 274, and the uppermost edge 300a of guide member 300, at the side of the latter toward roller assembly 236, slightly overlaps vacuum chamber 292.

Guide roller assembly 236 includes a plurality of guide rollers 304 which oppose carrier drum 274 with a small clearance therebetween, for example, a clearance of tens of microns, and are supported by means of a rotary shaft 306 rotatably supported in mounting brackets 308 fixed on movable frame 232. The rotary shaft 306 lies parallel to carrier drum 274. The guide rollers 304 are made of an elastically deformable material, such as, rubber, and have an external diameter substantially smaller than that of carrier drum 274. The guide rollers 304 are aligned on rotary shaft 306 so that uppermost portions of guide rollers 304 protrude slightly upwardly through the gap or clearance 268 of book support 238.

A pulley 310 is fixed to rotary shaft 306 for rotation therewith. A roller drive wire 312 is wound around pulley 310 and is secured, at its ends, to side walls 218 by way of resilient springs 314. The resilient springs 314 provide the requisite tension in roller drive wire 312 for rotatingly driving guide rollers 304 during travel in the page turning and return directions together with movable chassis 232.

The guide rollers 304 are designed to return to the stack of pages which are yet to be read or scanned, any extra pages that happen to adhere to carrier drum 274. Therefore, guide rollers 304 normally rest against the pages of the book with a particular friction. Such friction of guide rollers 304 should not be so great that it interferes with the turning of the page by carrier drum 274, but it should be sufficient to prevent turning of more than one page at a time.

Similarly to the first-described embodiment, a photo-insulator plate 316 is fixed to movable chassis 232 for lateral movement therewith. In this case, the photo-insulator plate 316 extends substantially horizontally from the front edge of movable chassis 232, and is vertically located above the position of grooves 233 so as to cooperate with one of three photo-sensors 318,320 and 322 which are secured on front guide rail 235. The photo-sensor 318 is adapted to detect the positioning of movable chassis 232 at the first position. The photo-sensor 322 is adapted to detect the positioning of movable chassis 232 at the second position. The photo-sensor 320 is located between the photo-sensors 318 and 322 and is adapted to detect the presence of movable chassis 232 at the position where carrier drum 274 passes the spine 226c of book 226. Each of photo-sensors 318,320 and 322 is generally U-shaped or channel-shaped and has a light emitter and a light receiver opposing each other. A path for the photo-insulating plate 316 is defined between the light emitter and the light receiver of each photo-sensor.

An optical reading device 324 (FIGS. 8 and 9) scans the pages of the books for reading the information thereon. The optical reading device 324 is mounted on the lower surface of book support 238. The book support 238 should be transparent, at least at the section where the optical reading device 324 is mounted, to allow the device 324 to read the information from the pages of the book.

The optical reading device 324 (FIGS. 8 and 9) can be a CCD line sensor or the like, which is appropriate for optically reading information from the pages of a book. The optical reading device 324 is located near carrier drum 274 so that optical reading device 324 moves in advance of carrier drum 274 during page turning travel. With this arrangement, the optical reading device 324 can read information from a page 226a (FIG. 14A) before the page 226a is picked up by carrier drum 274 and turned to the stack of turned pages.

The operation of the above-described second embodiment of the page turning device according to the present invention, will now be described with reference to FIGS. 14(A) and 14(B).

FIG. 14(A) shows movable chassis 232 at the start of the actual page turning operation, that is, after movable chassis 232 has been moved toward the right from the so-called first position in which photo-sensor 318 as interrupted by photo-insulator plate 316. In such first position, the vacuum generator generates a vacuum applied through vacuum hoses 298 to vacuum chamber 296 within carrier drum 274. At the same time, drive wire 240 drives the movable chassis 232 in the page turning direction, that is, to the right, to the position shown in FIG. 14(A) for initiating the actual page turning operation. At the position shown in FIG. 14(A), carrier drum 274 attains an angular position in which a first line of through openings 276 come into registry with vacuum chamber 292. The remaining lines of through openings 276 do not yet communicate with vacuum chamber 292. Therefore, the vacuum or suction acting at the first line of through openings 276, causes that left-hand edge portion of the page 226a of book 226 to adhere to carrier drum 274. As movable chassis 232 moves in the page turning direction, carrier drum 274 and guide roller 304, which also move in the page turning direction, rotate in the counterclockwise direction, as viewed in FIG. 14(A), due to engagement of drum driver wire 288 in peripheral groove 286 and the engagement of roller driver wire 312 with pulley 310.

Such counterclockwise rotation of carrier drum 274 successively wraps page 226a around the outer periphery of carrier drum 274. Further travel of movable chassis 232 and carrier drum 274 in the page turning direction brings the first line of carrier drum openings 276 out of the range of vacuum chamber 292 so that the vacuum is no longer effective through such openings 276 for adhering the left-hand edge portion of page 226a to the surface of carrier drum 274. Further travel in the page turning direction and the resulting further counterclockwise rotation of carrier drum 274, progressively frees the rest of page 226a from the influence of the vacuum in vacuum chamber 292. The progressively freed page is guided into page receiving space 302 defined by page guiding member 300.

Continuing travel of movable chassis 232 in the page turning direction brings carrier drum 274 opposite the spine 226c of book 226. The arrival of carrier drum 274 at the position opposing spine 226c is detected by the interruption of photo-sensor 320 by photo-insulator plate 316. In response to detection of carrier drum 274 at the position of spine 226c, the vacuum generator is made inoperative to terminate generation of the vacuum, and the pressure in vacuum chamber 292 within carrier drum 274 rises to atmospheric pressure.

As movable chassis 232 carrying drum 274 and guide rollers 304 further travels in the page turning direction, the guide rollers 304 withdraw or pull out page 226a from its resting place in page receiving space 302 and progressively revert such page at the bottom of the stack of the turned pages, as shown in FIG. 14(B). Finally, the arrival of movable chassis 232 at the so-called second position is detected by the interruption of photo-sensor 322 by photo-insulator plate 316. In response to detection of the arrival of movable chassis 232 at the second position, motor 246 stops driving movable chassis 232 in the page turning direction. Thereafter, motor 246 starts driving in the reverse direction to drive movable chassis 232 in the return direction. As a result, the movable chassis 232 with carrier drum 274 and guide rollers 304 are returned to the first position to stand by for the next page turning operation.

As described in connection with the first embodiment, optical reading means 324 will be active during the page turning operation to read information on the downwardly directed faces of pages 226a and 226b.

Figure 13:
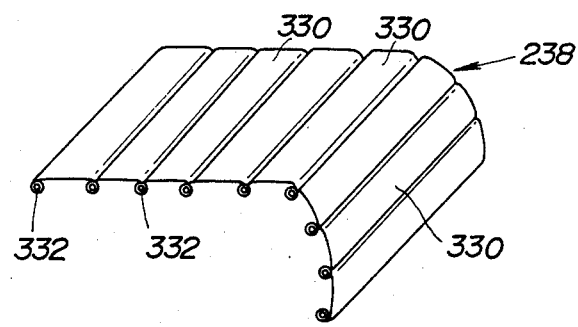
FIG. 13 is a partial perspective view of a modified construction of a book support that may be employed in the automatic page-turning device of FIG. 8.

Although the embodiment of the invention described above with reference to FIGS. 8–12 employs an endless belt 238 of flexible material, such as, glass fiber, aramid fiber and the like, to form the book support, it will be noted that such book support may be constituted by a plurality of rigid board-like members 330 connected by hinges 332 to form a belt, as shown in FIG. 13.

Having specifically described several preferred embodiments of the invention for purposes of illustration, it will be appreciated that the invention is not limited to those specific embodiments, and that various changes and modifications may be effected therein by one skilled in the art without departing from the scope or spirit of the invention as defined in the appended claims.

What is claimed is:

1. An automatic page-turning device for turning pages of a book or the like as placed in an opened condition to expose a first page to be turned at one side of a spine and a second page in a stack of turned pages at the opposite side of the spine, comprising:
   carrier means opposing an outer edge portion of said first page in a first position and being movable to a second position in which said carrier means opposes an outer edge portion of said second page;
   means for applying a vacuum to said carrier means in said first position for causing adherence of said first page thereto and the transport of said first page therewith toward said second position;
   means associated with said carrier means for isolating said first page from the effect of said vacuum during the travel of said carrier means from said first position toward said second position and thereby releasing said first page from said carrier means;
   page guiding means cooperative with said carrier means and movable therewith for receiving said first page as released from said carrier means and carrying said first page at least until said carrier means passes said spine of the book or the like; and
   means for withdrawing said first page from said guiding means and stacking the same against said second page during final movement of said carrier means to said second position.

2. An automatic page-turning device as in claim 1; further comprising means for retaining said book or the like in an initially set position.

3. An automatic page turning device as in claim 2; wherein said means for retaining said book or the like includes a movable component on which said book is supported and being movable with said carrier means, and a stationary component which restricts movement of said book with said movable component.

4. An automatic page-turning device as in claim 3; wherein said carrier means includes a hollow cylindrical drum defining an internal space connected to said means for applying a vacuum and formed with a plurality of through openings communicating said internal space with the exterior of said drum for drawing the opposing first page thereagainst.

5. An automatic page-turning device as in claim 4; wherein said cylindrical drum is rotatable in synchronism with the movement from said first position to said second position for rolling said first page on the outer periphery of said drum.

6. An automatic page-turning device as in claim 5; wherein said means for isolating said first page from the effect of said vacuum is disposed within said internal space of said cylindrical drum and interrupts communication of said through openings with said vacuum at a given angular position of said drum for releasing said first page from the outer periphery of said drum.

7. An automatic page-turning device as in claim 6; further comprising driving means associated with said cylindrical drum to rotate said drum to cause angular displacement in synchronism with said movement of said cylindrical drum from said first position to said second position.

8. An automatic page-turning device as in claim 6; wherein said means for withdrawing the first page from said guide means includes a roller positioned substantially in parallel, side-by-side relationship with said cylindrical drum and being movable therewith with a substantially small gap therebetween.

9. An automatic page-turning device as in claim 8; wherein said roller is arranged relative to said cylindrical drum to provide said substantially small gap therebetween with a width which is sufficient for passing only a single page drawn against said cylindrical drum so as to prevent any extra pages from being turned simultaneously with said first page.

10. An automatic page-turning device as in claim 9; wherein said roller is located to follow said cylindrical drum during movement of said cylindrical drum from said first position to said second position.

11. An automatic page-turning device as in claim 10; further comprising driving means driving said roller in rotation in synchronism with the movement of said roller with said cylindrical drum from said first position to said second position.

12. An automatic page-turning device as in claim 11; wherein said driving means associated with said roller includes a rack extending along the path of movement of said roller with said cylindrical drum and a gear rotatable with said roller and engaging said rack.

13. An automatic page-turning device as in claim 11; wherein said driving means associated with said roller is a drive wire wound around said roller and having stationarily secured ends.

14. An automatic page-turning device as in claim 13; wherein said ends of the drive wire are stationarily secured through resilient members which provide a predetermined tension for said wire.

15. An automatic page-turning device as in claim 11; wherein said roller is made of an elastically deformable material.

16. An automatic page-turning device as in claim 7; wherein said driving means associated with said cylindrical drum includes a rack extending along the path of movement of said cylindrical drum and a gear rotatable with said cylindrical drum and engaging said rack.

17. An automatic page-turning device as in claim 7; wherein said driving means associated with said cylindrical drum includes a drive wire wound around said cylindrical drum and having stationarily secured ends.

18. An automatic page-turning device as in claim 17; wherein said ends of the drive wire are stationarily secured through resilient members which provide a predetermined tension for said wire.

19. An automatic page-turning device as in claim 8; wherein said movable component of said means for retaining the book or the like includes a pair of rigid board members arranged in spaced apart, co-planar relationship to each other for defining a gap therebetween through which said cylindrical drum and said roller extend to oppose said book.

20. An automatic page-turning device as in claim 8; wherein said movable component of said means for retaining the book or the like includes a flexible belt-like member forming a loop and having spaced apart ends defining a gap therebetween through which said cylindrical drum and said roller extend to oppose said book.

21. An automatic page-turning device for automatically turning pages of a book or the like, comprising:
support means for supporting said book or the like thereon and being movable relative to said book or the like between predetermined first and second positions;
retainer means for retaining said book or the like in place while said support means moves relative thereto between said first and second positions;
means defining a source of vacuum;
page carrier means associated with said support means for movement therewith and with said source of vacuum for picking up a page to be turned with vacuum from said source and carrying said page to be turned during movement in a first direction with said support means from said first position to said second position;
vacuum interrupting means associated with said page carrier means for isolating the latter from said source of vacuum and thereby freeing the pickup up page from said carrier means;
page holder means for receiving the picked up page released from said page carrier means and moving together with said support means and said page carrier means; and
reverting means for pulling said picked up page out of said page holder means and situating the same in a stack of turned pages of said book and the like.

22. An automatic page-turning device as in claim 21; further comprising a movable frame mounting said support means, said page carrier means, said vacuum interrupting means, said page holder means and said reverting means thereon and being movable for carrying said support means between said first position and said second position.

23. An automatic page-turning device as in claim 22; wherein said movable frame is associated with first driving means to be thrustingly driven for carrying said support means, said page carrier means, said vacuum interrupting means, said page holder means and said reverting means between said first position and said second position.

24. An automatic page-turning device as in claim 23; wherein said support means defines a gap for exposing said page carrier means and said reverting means to oppose said pages of said book or the like.

25. An automatic page-turning device as in claim 24; wherein said page carrier means and said reverting means are arranged in side-by-side relationship to each other within said gap defined in said support means, and said page carrier means is arranged at a position leading said reverting means during the movement in said first direction.

26. An automatic page-turning device as in claim 25; wherein said page carrier means includes a hollow cylinder defining therein a vacuum chamber and formed with a plurality of openings establishing communication between the interior and exterior of said cylinder so that said page to be turned is drawn against the outer periphery of said cylinder.

27. An automatic page-turning device as in claim 26; wherein said cylinder is rotatable for rotation in synchronism with the movement from said first position to said second position for rolling said page to be turned on to the outer periphery thereof.

28. An automatic page-turning device as in claim 27; wherein said vacuum interrupting means is disposed with in said interior of said cylinder and isolates said through openings within a predetermined angular range from communication with said source of vacuum for releasing said first page from the outer periphery of said drum.

29. An automatic page-turning device as in claim 28; wherein said cylinder is associated with second driving means to be rotationally driven in synchronism with movement of said cylinder from said first position to said second position.

30. An automatic page-turning device as in claim 28; wherein said reverting means includes a roller arranged relative to said cylinder to define therebetween a substantially small clearance which is sufficient for the passage therethrough of only a single page drawn against said cylindrical drum, thereby to prevent any extra pages from being turned simultaneously.

31. An automatic page-turning device as in claim 30; wherein said roller is associated with a third driving means for rotation in synchronism with movement of said roller with said cylinder from said first position to said second position.

32. An automatic page-turning device as in claim 31; further comprising page unfolding means for unfolding any folded edge of said pages of said book.

33. An automatic page-turning device as in claim 32; wherein said support means includes a pair of rigid board members arranged in spaced apart relationship to each other for defining said gap therebetween.

34. An automatic page-turning device as in claim 32; wherein said support means includes a flexible belt-like member forming a loop and having ends arranged in spaced apart relationship to each other for defining said gap therebetween.

35. An automatic page-turning device as in claim 32; further comprising first detector means for detecting when said cylinder opposes a spine of said book and for producing a first detector signal in response thereto.

36. An automatic page-turning device as in claim 35; wherein said source of vacuum terminates operates in response to said first detector signal.

37. An automatic page-turning device as in claim 32; further comprising optical reading means for reading information on said page to be turned, said optical reading means being arranged in respect to said cylinder so as to oppose said page to be turned in advance of said cylinder drawing thereagainst said page to be turned.

38. An automatic page-turning device as in claim 37; wherein said optical reading means includes a CCD line sensor.

39. An optical reader system for reading information in a book or the like comprising:

optical reading means for opposing pages of said book or the like and for reading information thereon; and an automatic page-turning device for turning pages of a book or the like as placed in an opened condition to expose a first page to be turned at one side of a spine and a second page in a stack of turned pages at the opposite side of the spine, comprising:

carrier means opposing an outer edge portion of said first page in a first position and being movable to a second position in which said carrier means opposes an outer edge portion of said second page;

means for applying a vacuum to said carrier means in said first position for causing adherence of said first page thereto and the transport of said first page therewith toward said second position;

means associated with said carrier means for isolating said first page from the effect of said vacuum during the travel of said carrier means from said first position toward said second position and thereby releasing said first page from said carrier means;

page guiding means cooperative with said carrier means and movable therewith for receiving said first page as released from said carrier means and carrying said first page at least until said carrier means passes said spine of the book or the like; and means for withdrawing said first page from said guiding means and stacking the same against said second page during final movement of said carrier means to said second position.

40. An optical reader system as in claim 39; further comprising means for retaining said book or the like in an initially set position.

41. An optical reader system as in claim 40; wherein said means for retaining said book or the like includes a movable component on which said book is supported and being movable with said carrier means, and a stationary component which restricts movement of said book with said movable component.

42. An optical reader system as in claim 41; wherein said optical reading means is mounted on said movable component of said means for retaining the book so as to move with said movable component for scanning said first and second pages.

43. An optical reader system as in claim 42; wherein said optical reading means includes a CCD line sensor.

44. An optical reader system as in claim 43; wherein said carrier means includes a hollow cylindrical drum defining an internal space connected to said means for applying a vacuum and formed with a plurality of through openings communicating said internal space with the exterior of said drum for drawing the opposing first page thereagainst.

45. An optical reader system as in claim 44; wherein said cylindrical drum is rotatable in synchronism with the movement from said first position to said second position for rolling said first page on the outer periphery of said drum.

46. An optical reader system as in claim 45; wherein said means for isolating said first page from the effect of said vacuum is disposed within said internal space of said cylindrical drum and interrupts communication of said through openings with said vacuum at a predetermined angular position of said drum for releasing said first page from the outer periphery of said drum.

47. An optical reader system as in claim 46; said page-turning device further comprises driving means associated with said cylindrical drum for rotating said drum in synchronism with said movement of said cylindrical drum from said first position to said second position.

48. An optical reader system as in claim 46; wherein said means for withdrawing the first page from said guide means includes a roller positioned substantially in parallel, side-by-side relationship with said cylindrical drum and being movable therewith with a substantially small gap therebetween.

49. An optical reader system as in claim 48; wherein said roller is arranged relative to said cylindrical drum to provide said substantially small gap therebetween with a width which is sufficient for passing only a single page drawn against said cylindrical drum so as to prevent any extra pages from being turned simultaneously with said first page.

50. An optical reader system in claim 49; wherein said roller is located to follow said cylindrical drum during movement of said cylindrical drum from said first position to said second position.

51. An optical reader system in claim 50; in which said page-turning device further comprises driving means driving said roller in rotation in synchronism with the movement of said roller with said cylindrical drum from said first position to said second position.

52. An optical reader system in claim 51; wherein said driving means associated with said roller includes a rack extending along the path of movement of said roller with said cylindrical drum and a gear rotatable with said roller and engaging said rack.

53. An optical reader system as in claim 51; wherein said driving means associated with said roller is a drive wire wound around said roller and having stationarily secured ends.

54. An optical reader system as in claim 53; wherein said ends of the drive wire are stationarily secured through resilient members which provide a predetermined tension for said wire.

55. An optical reader system as in claim 51; wherein said roller is made of an elastically deformable material.

56. An optical reader system as in claim 47; wherein said driving means associated with said cylindrical drum includes a rack extending along the path of movement of said cylindrical drum and a gear rotatable with said cylindrical drum and engaging said rack.

57. An optical reader system as in claim 47; wherein said driving means associated with said cylindrical drum includes a drive wire wound around said cylindrical drum and having stationarily secured ends.

58. An optical reader system as in claim 57; wherein said ends of the drive wire are stationarily secured through resilient members which provide a predetermined tension for said wire.

59. An optical reader system in claim 58; wherein said movable component of said means for retaining the book or the like includes a pair of rigid board members arranged in spaced apart, co-planar relationship to each other for defining a gap therebetween through which said cylindrical drum and said roller extend to oppose said book.

60. An optical reader system in claim 58; wherein said movable component of said means for retaining the book or the like includes a flexible belt-like member forming a loop and having spaced apart ends defining a gap therebetween through which said cylindrical drum and said roller extend to oppose said book.

* * * * *